(12) United States Patent
Rose et al.

(10) Patent No.: US 10,807,351 B2
(45) Date of Patent: Oct. 20, 2020

(54) PROCESS FOR PRODUCING A LAMINATE FOR A FLOOR COVERING

(71) Applicant: WINDMÖLLER GMBH, Augustdorf (DE)

(72) Inventors: Stefan Rose, Warstein (DE); Georg Kruse, Herford (DE); Ulrich Windmöller, Schloss Holte-Stukenbrock (DE)

(73) Assignee: Windmöller GmbH, Augustdorf (DE)

( * ) Notice: Subject to any disclaimer, the term of this patent is extended or adjusted under 35 U.S.C. 154(b) by 34 days.

(21) Appl. No.: 16/464,843

(22) PCT Filed: Jan. 10, 2018

(86) PCT No.: PCT/EP2018/050544
§ 371 (c)(1),
(2) Date: May 29, 2019

(87) PCT Pub. No.: WO2018/130560
PCT Pub. Date: Jul. 19, 2018

(65) Prior Publication Data
US 2019/0299583 A1   Oct. 3, 2019

(30) Foreign Application Priority Data

Jan. 16, 2017   (DE) .......................... 10 2017 100 735

(51) Int. Cl.
*B32B 37/26*   (2006.01)
*B32B 5/22*   (2006.01)
(Continued)

(52) U.S. Cl.
CPC .............. *B32B 37/26* (2013.01); *B32B 5/022* (2013.01); *B32B 5/18* (2013.01); *B32B 5/22* (2013.01);
(Continued)

(58) Field of Classification Search
USPC .................................................. 156/247, 249
See application file for complete search history.

(56) References Cited

U.S. PATENT DOCUMENTS 9,079,212 B2 * 7/2015 Pervan ...................... B41M 5/50
9,279,058 B2 * 3/2016 Pervan ................... B41F 19/002
(Continued)

FOREIGN PATENT DOCUMENTS

EP   1262607 A1   12/2002
EP   3192935 A1 * 7/2017   ............... B32B 3/06
(Continued)

*Primary Examiner* — Sing P Chan
(74) *Attorney, Agent, or Firm* — Richard M. Goldberg

(57) ABSTRACT

A method for producing a laminate (1), preferably for a floor covering, wherein the laminate (1) has a decorative layer and a wear layer made of polyurethane, includes the following steps:
  applying a first liquid polyurethane material (12) on a release layer (11) to form the wear layer,
  inserting a decorative sheet (14) into the first polyurethane material (12),
  applying a second liquid polyurethane material (17) on the decorative sheet (14), which is impregnated with the first polyurethane material (12) and with the second polyurethane material (17),
  supplying heat energy for curing the first polyurethane material (12) and the second polyurethane material (17), and
  separating the release layer (11) from the wear layer,
  wherein the heat energy is supplied to the first polyurethane material (12) and the second polyurethane material (17) from below through the release layer.

18 Claims, 1 Drawing Sheet

(51) Int. Cl.
| | | |
|---|---|---|
| *B32B 27/06* | (2006.01) | |
| *B32B 5/26* | (2006.01) | |
| *B32B 5/18* | (2006.01) | |
| *B32B 21/06* | (2006.01) | |
| *B32B 5/24* | (2006.01) | |
| *B32B 29/02* | (2006.01) | |
| *B32B 21/10* | (2006.01) | |
| *B32B 7/06* | (2019.01) | |
| *B32B 29/00* | (2006.01) | |
| *B32B 21/08* | (2006.01) | |
| *B32B 7/12* | (2006.01) | |
| *B32B 27/10* | (2006.01) | |
| *B32B 27/40* | (2006.01) | |
| *B32B 37/24* | (2006.01) | |
| *E04F 15/10* | (2006.01) | |
| *B32B 37/12* | (2006.01) | |
| *B32B 5/02* | (2006.01) | |
| *B32B 27/12* | (2006.01) | |

(52) U.S. Cl.
CPC ............ *B32B 5/245* (2013.01); *B32B 5/26* (2013.01); *B32B 7/06* (2013.01); *B32B 7/12* (2013.01); *B32B 21/06* (2013.01); *B32B 21/08* (2013.01); *B32B 21/10* (2013.01); *B32B 27/065* (2013.01); *B32B 27/10* (2013.01); *B32B 27/12* (2013.01); *B32B 27/40* (2013.01); *B32B 29/005* (2013.01); *B32B 29/02* (2013.01); *B32B 37/1207* (2013.01); *B32B 2037/243* (2013.01); *B32B 2037/268* (2013.01); *B32B 2255/24* (2013.01); *B32B 2260/021* (2013.01); *B32B 2260/026* (2013.01); *B32B 2260/028* (2013.01); *B32B 2260/046* (2013.01); *B32B 2262/06* (2013.01); *B32B 2262/101* (2013.01); *B32B 2264/0235* (2013.01); *B32B 2264/10* (2013.01); *B32B 2264/101* (2013.01); *B32B 2264/102* (2013.01); *B32B 2264/104* (2013.01); *B32B 2307/554* (2013.01); *B32B 2307/718* (2013.01); *B32B 2307/732* (2013.01); *B32B 2307/748* (2013.01); *B32B 2375/00* (2013.01); *B32B 2419/04* (2013.01); *B32B 2471/00* (2013.01); *B32B 2607/00* (2013.01); *E04F 15/105* (2013.01)

(56) References Cited

U.S. PATENT DOCUMENTS

| | | | | |
|---|---|---|---|---|
| 9,321,925 | B2 * | 4/2016 | Pervan | B05D 7/50 |
| 9,371,456 | B2 * | 6/2016 | Pervan | B44C 5/04 |
| 9,528,011 | B2 * | 12/2016 | Pervan | C09D 11/037 |
| 9,630,404 | B2 * | 4/2017 | Pervan | B05D 7/50 |
| 9,670,371 | B2 * | 6/2017 | Pervan | B05D 3/002 |
| 9,738,095 | B2 * | 8/2017 | Pervan | C09D 11/037 |
| 9,873,803 | B2 * | 1/2018 | Pervan | B41J 3/407 |
| 10,029,484 | B2 * | 7/2018 | Pervan | B05D 3/12 |
| 10,189,281 | B2 * | 1/2019 | Pervan | B05D 3/065 |
| 10,369,814 | B2 * | 8/2019 | Pervan | B05D 1/12 |
| 10,384,471 | B2 * | 8/2019 | Pervan | B41M 5/50 |
| 10,596,837 | B2 * | 3/2020 | Pervan | C09D 7/69 |
| 10,723,147 | B2 * | 7/2020 | Pervan | B05D 3/067 |
| 2007/0085337 | A1 * | 4/2007 | Endres | B42D 25/435 286/81 |
| 2014/0196618 | A1 * | 7/2014 | Pervan | B05D 7/52 101/32 |
| 2014/0198168 | A1 * | 7/2014 | Pervan | B41F 17/00 347/110 |
| 2014/0198170 | A1 * | 7/2014 | Pervan | B41J 3/407 347/176 |
| 2014/0199495 | A1 * | 7/2014 | Pervan | B05D 3/067 427/553 |
| 2014/0199513 | A1 * | 7/2014 | Pervan | B05D 3/12 428/106 |
| 2014/0199531 | A1 * | 7/2014 | Pervan | B05D 5/06 428/207 |
| 2015/0274997 | A1 * | 10/2015 | Pervan | B05D 5/06 428/207 |
| 2016/0144612 | A1 * | 5/2016 | Pervan | B41M 5/506 101/28 |
| 2016/0208116 | A1 * | 7/2016 | Pervan | B41M 5/0017 |
| 2016/0250853 | A1 * | 9/2016 | Pervan | B41M 5/0023 347/56 |
| 2016/0361894 | A1 | 12/2016 | Ciuperca | |
| 2017/0066255 | A1 * | 3/2017 | Pervan | B05D 3/002 |
| 2017/0204281 | A1 * | 7/2017 | Pervan | B44C 5/04 |
| 2017/0232761 | A1 * | 8/2017 | Pervan | B05D 7/50 347/102 |
| 2017/0348984 | A1 * | 12/2017 | Pervan | C09D 11/02 |
| 2018/0111390 | A1 * | 4/2018 | Pervan | B05D 3/12 |
| 2018/0127605 | A1 * | 5/2018 | Pervan | B44C 5/04 |
| 2018/0298216 | A1 * | 10/2018 | Pervan | B05D 3/002 |
| 2019/0119513 | A1 * | 4/2019 | Pervan | B41J 2/01 |
| 2019/0299583 | A1 * | 10/2019 | Rose | B32B 37/1207 |
| 2019/0345348 | A1 * | 11/2019 | Pervan | B05D 1/02 |
| 2020/0079114 | A1 * | 3/2020 | Pervan | C08K 3/22 |
| 2020/0171849 | A1 * | 6/2020 | Pervan | B05D 7/52 |

FOREIGN PATENT DOCUMENTS

| | | | |
|---|---|---|---|
| WO | 2009120547 | 10/2009 | |
| WO | WO-2018130560 A1 * | 7/2018 | ............ B32B 27/12 |

* cited by examiner

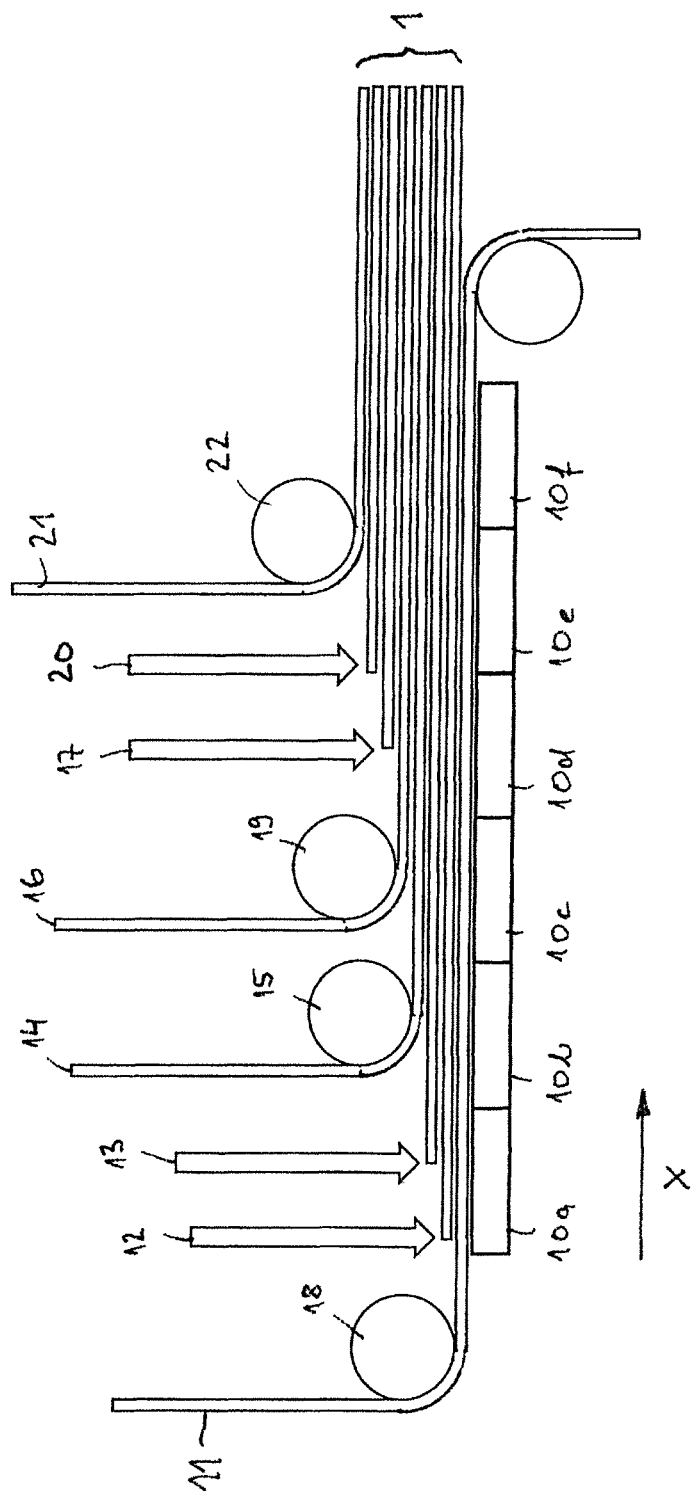

PROCESS FOR PRODUCING A LAMINATE FOR A FLOOR COVERING

BACKGROUND OF THE INVENTION

The invention relates to a process for producing a laminate, preferably for a floor covering.

A process for producing a floor panel is known from EP 1 262 607 B1. For this process, a laminate, consisting of a wear layer, a decorative layer with a decorative paper and a polyurethane layer, applied to a back of the decorative paper, is laminated to a hard carrier plate such as MDF or HDF. In one embodiment, the wear layer is made of a UV-curable polyurethane coating. Due to the soft, cushioning polyurethane layer between the decorative layer and the hard carrier plate, such a laminated flooring panel has a comparatively good noise reduction effect. Due to the polyurethane coating, in contrast to hard wear layers made of melamine, the wear layer can follow the deformation of the decorative paper and of the damping polyurethane layer.

However, the preparation of the polyurethane laminate described above has turned out to be difficult. For example, in the course of curing the polyurethane, air or vapor inclusions, which are detrimental to the transparency of the wear layer and thus to the aesthetic effect of the decorative layer, may be formed in the wear layer. It has also been found that the desired wear resistance cannot be achieved despite the use of mineral particles in the wear layer. In addition, it is difficult to design and control the heat input necessary for the targeted curing of the polyurethane in the production process in such a way, that the laminate meets all the quality requirements, which have been set.

SUMMARY OF THE INVENTION

It is therefore an object of the invention to provide a method for producing a laminate based on polyurethane, by means of which a simple production of a high-quality laminate should be possible.

The object, on which the invention is based, is achieved by the combination of features of the claims. Embodiments of the invention may be taken from the dependent claims.

For the inventive method, a first liquid polyurethane material is applied to a release layer to form the wear layer. A decorative sheet is inserted into this first polyurethane material. This insertion can be done by suitable means, such as a soft roller with a particular pressure. After the decorative sheet is placed into the first polyurethane material, a second liquid polyurethane material is applied onto the decorative sheet (or onto the first polyurethane material). The decorative sheet is impregnated with the first polyurethane material and the second polyurethane material. The decorative sheet is impregnated from two sides, namely, on the one hand, from the side of the decorative sheet, which faces the release layer and can also be referred to as the upper side, since, in the inserted position of the laminate, it points upward. On the other hand, the impregnation takes place from the side of the decorative sheet, onto which the second polyurethane material was applied (also called the lower side of the decorative sheet).

Heat energy is supplied for curing the first polyurethane material and the second polyurethane material. Preferably, the first polyurethane material comprises at least two components, by the reaction of which with one another the curing of the polyurethane material takes place. The reaction can be accelerated or controlled by supplying heat energy.

After at least a partial curing of the first polyurethane material, the release layer is separated from the wear layer formed by the first polyurethane material. In accordance with the invention, the heat energy is supplied to the first polyurethane material and to the second polyurethane material from below through the release layer. By supplying heat in this manner, it is possible to control the manufacturing process very accurately in the desired manner, so that a laminate of high quality can be produced.

The laminate can be used, in particular, as a floor covering or as a component of a floor covering. However, It can also be used as a wall or ceiling covering.

In one embodiment, the heat energy is supplied exclusively (to the extent of 100%) from below through the release layer. This means that there is no further external energy input, by means of which the curing of the polyurethane materials is controlled or accelerated. The external energy yield is differentiated here from the natural energy input (heat, possibly UV radiation, etc.) by the environment, in which the process takes place. In an alternative embodiment, the energy fraction from below through the release layer is more than 80%, the remaining 20% for the curing, for example, being made available by radiators from above.

The release layer may rest on at least one hotplate, the temperature of which is less than 100° C. in a preferred embodiment. A temperature level for the hotplate of 70° to 100° C. and preferably of 75° to 90° C., has proven to be particularly favorable for the process. At this temperature level, water can be used as the energy source for heating the hotplate and, apart from the pump pressure for circulating the water, can be passed through the hot plate without pressure. This simplifies the construction of the hotplate and the connection of the hotplate to a boiler or the like. Other heat transfer media, such as oil, may also be used to heat the hotplate.

A separate reinforcing sheet, which, similar to the decorative sheet, is impregnated through the first polyurethane material and/or through the second polyurethane material, may be placed on the decorative sheet. The separate reinforcing sheet preferably is placed on the decorative sheet before the second polyurethane material is applied to the decorative sheet. Thus, as seen from above from the release layer and therefore in the use position of the laminate, the following layer structure results:

the first polyurethane material, which forms the wear layer;
the decorative sheet and the reinforcing sheet;
the reinforcing sheet;
a back layer of the second polyurethane material.

The decorative sheet and the reinforcing sheet preferably are impregnated with the first polyurethane material and the second polyurethane material, so that the boundary between the first polyurethane material and the decorative sheet and the boundary between the reinforcing sheet and the second polyurethane material are fluid. This means that even when the reinforcing sheet is used, the second polyurethane material can penetrate up to the decorative sheet and contribute to the impregnation there. The same applies analogously to the reinforcing sheet. This may also be impregnated preferably both by the second polyurethane material and by the first polyurethane material. The joint impregnation of the decorative sheet and the reinforcing sheet, each of which has two sides, leads to a composite, which has a good tear or gap strength in the direction perpendicular to the one in which the surface of the individual layers extends.

The reinforcing sheet preferably is made of a glass mat. Alternatively or in addition, a glass fabric may also be used. The mat and/or the fabric may also be made of other reinforcing materials.

In a preferred embodiment, the decorative sheet, the reinforcing sheet (if such a one is provided) and the release layer are each moved as a continuous web over the hotplate or over several consecutively connected hotplates. The laminate may thus be produced in a continuous process. Preferably, the individual hotplates may be supplied individually with thermal energy, so that they are heated, for example, differently and have different temperature levels. The individual materials or sheets preferably are applied or deposited at a certain distance above the hotplates, as seen in the direction of movement. Thus, a targeted supply of heat can be adjusted for each application or each deposition.

The release layer can be held on the hotplate by negative pressure. The negative pressure should be adjusted so that the tensile forces for moving the release layer relative to the hotplate are not large enough to break the release layer. Due to the negative pressure, the release layer is not only obtained in the desired position and/or in the desired path. The negative pressure also ensures direct contact between the release layer and the hotplate, which ensures good heat transfer from the hotplate to the release layer. This allows the heat, which is passed through the release layer and hardens the first polyurethane material and the second polyurethane material, to be adjusted reliably and accurately.

In one embodiment, the release layer has a surface structure to form an outer surface of the wear layer with a corresponding (negative) surface structure. For example, for a decorative sheet, on which a wood decor is printed, the release layer may be embossed so that its surface structure has small protuberances, which result in corresponding small recesses, which imitate wood pores in the outer surface of the wear layer. Basically, the type, size, distribution and arrangement of the individual protuberances or depressions of the surface structure of the release layer can be chosen freely. Preferably, however, they are associated with the printed image of the decorative sheet. Thus, in one embodiment, a protuberance in the release layer and a graphical feature of the decorative sheet may be aligned precisely. The surface structure of the outer surface of the wear layer may thus enhance the aesthetic effect of the decorative sheet. This results in a laminate with an outer surface, which has precisely aligned surface features. Such an alignment of surface structure and printed image is comparable to the known EIR technology (Embossed-In-Register or Synchronpore).

Before the decorative sheet is inserted, mineral particles may be sprinkled in dry form onto the first polyurethane material. Preferably, the mineral particles comprise corundum particles with a particle size of 30 to 80 μm. Preferably, the first polyurethane material should be such (this can be adjusted by the heat energy supplied) that the corundum particles do not sink down to the release layer, but rather are kept at a certain distance therefrom in the polyurethane material. On the other hand, the first polyurethane material must not be too viscous, as otherwise complete impregnation of the decorative sheet could be difficult. The comparatively large corundum particles ensure very good resistance to wear of the laminate. Due to the distance between corundum particles and the release layer, the latter is not damaged. The risk that the corundum particles will prevent homogeneous pouring of the surface structure of the release layer by a direct support on the release layer is also prevented by these means.

Preferably, the first polyurethane material is composed of aliphatic polyurethane components. The second polyurethane material preferably is composed of aromatic polyurethane components. It has been found that, despite the different polyurethane components, interfering boundary layers, as a result of which the gap strength of the laminate suffers excessively, are not formed in the laminate.

In one embodiment, the decorative sheet is a pulp-based decorative paper. The weight per unit area may vary from 20 to 80 $g/m^2$. In one embodiment, the weight per unit area is 30 to 50 $g/m^2$.

The decorative sheet may be passed as a continuous sheet over a first heating roller to reduce the residual moisture content of the sheet material. Preferably, the residual moisture content after the heating roller is less than 1% or even 0.5%. Alternatively or additionally, the release layer may be passed over a second heating roller, in order to keep the residual moisture content here also as low as possible.

A third polyurethane material may be applied onto the second polyurethane material. However, the third polyurethane material may be applied only when the first polyurethane material and the second polyurethane material have already been cured (completely). Alternatively, it is also possible to apply the third polyurethane material onto the still liquid or only partially cured second polyurethane material.

The third polyurethane material may contain organic or inorganic fillers. Sand, chalk, clay, minerals or glass come into consideration as inorganic fillers. Wood, cork, lignin, plant fibers, as well as polystyrene or granulates may be used as polymeric fillers.

The third polyurethane material may be applied in an amount, so that a polyurethane layer results, which may have a thickness of 100 to 5000 μm. This polyurethane layer may be reinforced by inserting a (further) reinforcing sheet. For example, a mat or a fabric (for example, a glass mat or a glass fabric) may be used here. To form a final functional layer, a functional sheet may be placed on the third polyurethane material. The functional layer may be a foam, a mat or even an adhesive layer, which may be covered with a release film. The functional layer may have a surface finish, by means of which the laminate can be laid without an adhesive on a suitable subfloor (loose-lay laying method).

The functional layer or the functional sheet may also be applied or placed directly onto the second polyurethane material. It is therefore not necessarily essential to provide a third polyurethane layer.

In one embodiment, the functional sheet is a cork panel, which, in a wound-up form, can be placed as a continuous sheet on the second polyurethane material or on the third polyurethane material. The cork panel is inserted preferably when the second polyurethane material and/or the third polyurethane material is/are still liquid or at least not yet cured.

Cork granulate can be used to produce the cork plate and bonded under mechanical pressure and/or vacuum with a binder to form the cork plate. Preferably, polyurethane is used as binder, so that a good bond can be achieved between a cork plate so produced (cork granulate with polyurethane as binder) and the second or third polyurethane material.

The thickness of the functional sheet (cork plate) may be between 500 and 5000 μm and preferably is 0.75 to 2 mm.

After the laminate has been produced, it may be cut into individual panels, the edges of which may be provided with profiles in order to connect structurally identical panels together. It is also possible to laminate it onto a carrier plate and then to cut the composite of support plate and laminate into panels. The profiles preferably are molded into the material of the support plate (for example, milled), in which case the thickness of the polyurethane layer of the third polyurethane material preferably is less (for example, 50 to 800 μm) or omitted entirely.

In one embodiment, an adhesive layer with a release film is applied to the surface of the laminate facing away from the wear layer. The laminate can thus be stored and transported as a rolled-up product in spite of the adhesive layer. The carrier plate, may then, for example, be connected spatially separated from the place of production of the laminate, particularly easily, since a separate application of adhesive to the carrier plate or the laminate is not necessary.

BRIEF DESCRIPTION OF THE DRAWING

The invention will be explained in greater detail by means of a single FIGURE. The FIGURE is intended to illustrate the inventive process for producing the laminate diagrammatically.

DETAILED DESCRIPTION

The FIGURE diagrammatically shows several successively arranged hotplates 10 (10a to 10f), over which a release layer 11 is guided in the form of a continuous sheet of release paper to produce a laminate 1. In the representation of the FIGURE, the release layer is moved from left to right, which is also illustrated by a horizontal direction of movement X. To begin with, a first polyurethane material 12 is applied on the release layer 11 from above at the height of the hotplate 10a. The first polyurethane material is in liquid form as it is being applied on the release layer 11. After the first polyurethane material 12 is applied onto the release layer 11, the dry corundum particles 13 are scattered on. Thereafter, a decorative sheet 14 is inserted in or placed on the first polyurethane material 12 (the terms insert and placed on are understood to be synonymous here). Since the first polyurethane material 12 is still liquid when the decorative sheet 14 is inserted, the impregnation of the decorative sheet 14 thus begins. The decorative sheet likewise is an endless sheet. Preferably, It is made of a decorative paper pulp.

The vertical height of a roller 15, with the aid of which the decorative sheet 14 is supplied to the already deposited layers, can be adjusted so that the decorative sheet 14 is pressed slightly into the first polyurethane material 12.

A separate reinforcing sheet 16, which is formed here as a continuous glass mat, is then placed over the decorative sheet 14. After the reinforcing sheet 16 is put down or inserted, a second liquid polyurethane material 17, which differs from the first polyurethane material 12, is applied.

The second liquid polyurethane material 17 is followed by a third liquid polyurethane material 20, which may be fortified for example, with fillers. Finally, to form a functional layer, a functional sheet 21, which is supplied by a roller 22, is placed on the third polyurethane material 20. The individual layers or the laminate are/is not compressed.

The impregnation of the decorative sheet 14 and of the reinforcing sheet 16 takes place both from below (primarily through the first polyurethane material 12) and also from above (primarily through the second polyurethane material 17). The degree of mixing of the polyurethane materials 12, 17 depends, on the one hand, on the permeability of sheets 14 and 16, and on the other, on the viscosity of the materials 12 and 17. The viscosity of the materials 12 and 17 can be adjusted inventively by controlling the heat supplied. The temperature of the hotplates and the feed rate of the release layer 11 can be used as control parameters.

Just as also the decorative sheet 14, the release layer 11 is supplied by a roller, which is labeled 18 here. Another roller, with which the reinforcing sheet 16 is deflected, is labeled 19. Further rollers, which are not shown here and by means of which the respective sheets are supplied or deflected, may be heated in order to reduce the residual moisture of the sheets. It should be noted that the FIGURE shows the production only diagrammatically, so that the position shown of the individual, possibly heated rollers 15, 18, 19 and 22 may differ significantly from the position of a real implementation of the method. This also applies analogously to the distances, dimensions, etc. shown in the FIGURE.

After passing by the last hotplate 10f, the polyurethane materials are cured to such an extent, that the release layer 11 can be separated from the laminate 1 and rolled up once again for further use. The laminate 1 can also be rolled up and thus stored and transported as a rolled-up product.

The heat energy, by means of which curing of the first polymeric material 12 and of the second polymeric material 17 is controlled and/or accelerated, is supplied to the process by the hotplates 10. A heat transfer medium in the form of hot water, the temperature of which ranges from 75° to 90° C., flows through the hotplates 10 and heats these accordingly. The hotplates 10 apply their heat through the release layer 11 to the first polyurethane material 12 and the second polyurethane material 17. The hot water is supplied hotplate-specific. This means, for example, that a different amount of heat is emitted by hotplate 10f than, for example, by hot plate 10a. For example, if the first polyurethane material 12 is still too liquid when the corundum particles 13 are scattered on it, the initial curing can be accelerated somewhat by increasing the input of heat by hotplate 10a. Conversely, the curing of the first polymer material must also not be too fast, if at least a certain degree of impregnation of the sheets 14, 16 through the first polyurethane material is to take place.

Assuming that after they have passed through the hotplate 10e, the decorative sheet 14 and the reinforcing sheet 16 are impregnated to the desired extent, a larger amount of heat may be supplied by the hotplate 10f to bring the curing to a conclusion quickly.

LIST OF REFERENCE SYMBOLS

1 Laminate
10 Hotplate (10a to 10f)
11 Release layer
12 First polyurethane material
13 Corundum particle
14 Decorative sheet
15 Roller
16 Reinforcng sheet
17 Second polyurethane material
18 Roller
19 Roller
20 Third polyurethane material
21 Funktional sheet
22 Roller
X Direction of movement

What is claimed is:

1. A method for producing a laminate for a floor covering, the laminate having a decorative layer and a wear layer of polyurethane, comprising following steps:

applying a first liquid polyurethane material to a release layer to form the wear layer, inserting a decorative sheet into the first polyurethane material, applying a second liquid polyurethane material to the decorative sheet, which is thereby impregnated with the first polyurethane material and the second polyurethane material, supplying heat energy for curing the first polyurethane material and the second polyurethane material from below through the release layer, separating the release layer from the wear layer.

2. The method of claim 1, wherein the step of supplying heat energy comprises resting the release layer on at least one hotplate, the temperature of which is lower than 100° C.

3. The method of claim 1, further comprising the step of placing a separate reinforcing sheet, which is impregnated with the second polyurethane material, on the decorative sheet.

4. The method of claim 3, wherein the reinforcing sheet is made of a glass mat.

5. The method of claim 3, wherein the decorative sheet, the reinforcing sheet and the release layer are each moved as a continuous sheet over at least one hotplate.

6. The method of claim 5, wherein the release layer is held by negative pressure on the at least one hotplate.

7. The method of claim 3, wherein the separate reinforcing sheet is impregnated with the first polyurethane material.

8. The method of claim 1, wherein the release layer has a surface structure to form an outer surface of the wear layer having a corresponding surface structure.

9. The method of claim 1, further comprising the step of, before the decorative sheet is inserted, scattering mineral particles in a dry form onto the first polyurethane material.

10. The method of claim 1, wherein the first polyurethane material is composed of aliphatic polyurethane components and the second polyurethane material of aromatic polyurethane components.

11. The method of claim 1, wherein the decorative sheet is a decorative paper based on pulp with a weight per unit area of 20 to 80 g/m$^2$.

12. The method of claim 1, wherein:
the decorative sheet is guided as a continuous sheet over a first heating roller,
the release layer is guided as a continuous sheet over a second heating roller, or
the decorative sheet is guided as a continuous sheet over a first heating roller and the release layer is guided as a continuous sheet over a second heating roller.

13. The method of claim 1, further comprising the step of applying a third polyurethane material on the second polyurethane material.

14. The method of claim 13, further comprising the step of placing a functional sheet the third polyurethane material.

15. The method of claim 1, further comprising the step of placing a functional sheet on the second polyurethane material.

16. The method of claim 15, wherein the functional sheet is a cork plate.

17. The method of claim 15, wherein the functional sheet is a cork plate.

18. The method of claim 1, further comprising the step of applying an adhesive layer with a release film on one of the surfaces of the laminate facing away from the wear layer.

* * * * *